(12) United States Patent
Rasbornig (10) Patent No.: US 9,651,572 B2
(45) Date of Patent: May 16, 2017

(54) SPEED SENSOR DEVICE, SPEED SENSOR METHOD, ELECTRONIC CONTROL UNIT AND CONTROL METHOD

(71) Applicant: Infineon Technologies AG, Neubiberg (DE)

(72) Inventor: Friedrich Rasbornig, Klagenfurt (AT)

(73) Assignee: Infineon Technologies AG, Neubiberg (DE)

(*) Notice: Subject to any disclaimer, the term of this patent is extended or adjusted under 35 U.S.C. 154(b) by 515 days.

(21) Appl. No.: 14/219,352

(22) Filed: Mar. 19, 2014

(65) Prior Publication Data
US 2015/0268263 A1   Sep. 24, 2015

(51) Int. Cl.
*G01P 3/00* (2006.01)
*B60T 17/18* (2006.01)
(Continued)

(52) U.S. Cl.
CPC .............. *G01P 3/00* (2013.01); *B60T 17/18* (2013.01); *B60T 17/22* (2013.01); *G01M 17/013* (2013.01); *G01P 3/489* (2013.01); *G01P 21/02* (2013.01)

(58) Field of Classification Search
CPC .......... B60T 17/18; B60T 17/22; G01P 21/02; G01P 3/489; G01P 3/00; G01M 17/013
(Continued)

(56) References Cited

U.S. PATENT DOCUMENTS 4,738,492 A * 4/1988 Matsuda ................. B60T 8/58
                                                303/157
4,999,779 A * 3/1991 Wood ..................... B60T 8/885
                                                180/197
(Continued)

FOREIGN PATENT DOCUMENTS

DE      19618867 A1    2/1997
JP      H11220610 A    8/1999
(Continued)

OTHER PUBLICATIONS

Infineon, *Wheel Speed Sensor: iGMR based Wheel Speed Sensor TLD5041 plus C*, May 2013, 30 pages 1-30, V 1.0, Published by Infineon Technologies AG.
(Continued)

*Primary Examiner* — Carol S Tsai
(74) *Attorney, Agent, or Firm* — Eschweiler & Potashnik, LLC (57) ABSTRACT

Embodiments relate to a speed sensor device including a sensor element to provide a sensor signal, a status module to provide status information of the speed sensor device; and a processing module to generate an output signal. The output signal is derived from the sensor signal, if the status information is indicative of a non-critical state of the speed sensor device, and the output signal is a safety message signal having signal edges such that time intervals between subsequent congeneric signal edges are equal to or shorter than a preselected threshold, if the status in-formation is indicative of a critical state of the speed sensor device. An
(Continued)

Electronic Control Unit (ECU) includes an interface for receiving a signal having signal edges from a speed sensor device and a processing unit to analyze time intervals between subsequent congeneric signal edges. The processing unit is configured to determine a non-critical state of the speed sensor device, if the time intervals are higher than a preselected thresh-old, and to determine a critical state of the speed sensor device, if the time intervals between two subsequent congeneric signal edges are equal to or shorter than the preselected threshold.

20 Claims, 7 Drawing Sheets

(51) Int. Cl.
    *G01M 17/013*     (2006.01)
    *B60T 17/22*     (2006.01)
    *G01P 3/489*     (2006.01)
    *G01P 21/02*     (2006.01)

(58) Field of Classification Search
    USPC .......... 702/145; 701/30.3, 30.4, 31.4, 36, 41
    See application file for complete search history.

(56) References Cited

U.S. PATENT DOCUMENTS

| | | | | |
|---|---|---|---|---|
| 5,050,194 A * | 9/1991 | Pickering | ............ | H04L 25/4904 327/7 |
| 5,153,835 A * | 10/1992 | Hashimoto | ........... | F02D 41/222 123/479 |
| 5,253,172 A * | 10/1993 | Ito | ......................... | B60K 28/16 180/400 |
| 5,420,730 A * | 5/1995 | Moon | ................... | G11B 5/5965 360/51 |
| 5,754,970 A * | 5/1998 | Takasaki | ............. | B60K 23/0808 180/233 |
| 7,065,442 B2 * | 6/2006 | Sakata | .................. | B60T 8/1755 701/70 |
| 7,095,238 B2 * | 8/2006 | Steinruecken | ........ | F02D 41/009 324/503 |
| 7,586,283 B2 * | 9/2009 | Kabashima | ............ | G01D 5/145 318/602 |
| 7,830,155 B2 * | 11/2010 | Zarkhin | ..................... | H02J 1/04 324/605 |
| 8,466,646 B2 * | 6/2013 | O'Gorman | ................ | H02P 6/18 318/400.32 |
| 8,897,965 B2 * | 11/2014 | Tamaizumi | .......... | B62D 5/0463 180/204 |
| 8,989,949 B2 * | 3/2015 | Lohberg | ............. | B60G 17/0195 701/30.3 |
| 9,046,457 B2 * | 6/2015 | Hanatsuka | ......... | B60G 17/0165 |
| 2004/0066183 A1 * | 4/2004 | Lohberg | ................. | B60T 8/171 324/166 |
| 2005/0216164 A1 * | 9/2005 | Sakata | .................. | B60T 8/1755 701/70 |
| 2014/0180544 A1 * | 6/2014 | Itamoto | .................. | B62D 5/049 701/41 |
| 2014/0365058 A1 * | 12/2014 | Senoo | ..................... | B60L 3/102 701/22 |

FOREIGN PATENT DOCUMENTS

JP            2006300783 A      11/2006
KR         1019960005344      2/1996

OTHER PUBLICATIONS

Infineon, *Advanced Diff. Speed Sensor TLD 4941 plus C,* Mar. 2010, pp. 1-13, Rev. 1.1, published by Infineon Technologies AG.

* cited by examiner

SPEED SENSOR DEVICE, SPEED SENSOR METHOD, ELECTRONIC CONTROL UNIT AND CONTROL METHOD

BACKGROUND

This section introduces aspects that may be helpful in facilitating a better understanding of embodiments. Accordingly, the statements of this section are to be read in this light and are not to be understood as admissions about what is in the prior art or what is not in the prior art.

In the field of automotive engineering it may be required to monitor a wheel speed of wheels of a vehicle or of other rotatable bodies of the vehicle. The wheel speed may be used, for example, in Anti-lock Braking System (ABS) applications or in transmission applications. Usually, wheel speed information is transmitted in a standard output protocol, for example as a current protocol with a low current $I_{low}=7$ mA and a high current $I_{high}=14$ mA from a sensor to an ECU of the vehicle. It may be useful to further provide the ECU with safety information, for instance about an error event. For this reason, a constant current $I_{low}=7$ mA or $I_{high}=14$ mA may be output in case of an error event, for example, if an external supply voltage falls below a predetermined low-voltage value or if a bit error appears in an internal sensor storage. Thus, the ECU may recognize the error event. If an internal error occurs and is detected chip internally, this fault has to be signalized with a constant $I_{low}$ or a constant $I_{high}$ current-level. In this case it is typically not possible to distinguish, for example, between an error indication or a wheel stands still, signalized by the wheel speed sensor to the ECU.

SUMMARY

Some simplifications may be made in the following summary, which is intended to highlight and introduce some aspects of the various example embodiments, but such simplifications are not intended to limit the scope of the inventions. Detailed descriptions of example embodiments adequate to allow those of ordinary skill in the art to make and use the inventive concepts will follow in later sections.

According to a first aspect of the present disclosure it is provided a speed sensor device. The speed sensor device includes a sensor element to provide a sensor signal. The speed sensor device further includes a status module to provide status information of the speed sensor device. The speed sensor device further includes a processing module to generate an output signal. The processing module is configured to derive the output signal from the sensor signal, if the status information is indicative of a non-critical state of the speed sensor device. If the status information is indicative of a critical state of the speed sensor device, the processing module is configured to provide the output signal as a safety message signal having signal edges such that time intervals between subsequent congeneric signal edges are equal to or shorter than a preselected threshold.

According to a further aspect it is provided a speed sensor method. The method comprises the acts of receiving a sensor signal, providing a status information of the speed sensor device and generating an output signal. The output signal is derived from the sensor signal, if the status information is indicative of a non-critical state of the speed sensor device. The output signal is a safety message signal having signal edges such that time intervals between subsequent congeneric signal edges are equal to or shorter than a preselected threshold, if the status information is indicative of a critical state of the speed sensor device.

According to yet a further aspect of the present disclosure it is provided an Electronic Control Unit (ECU). The ECU comprises an interface to receive a signal having signal edges from a speed sensor device and a processing unit to analyze time intervals between subsequent congeneric signal edges. The processing unit is configured to determine a non-critical state of the speed sensor device, if the time intervals are higher than a preselected threshold, and to determine a critical state of the speed sensor device, if the time intervals between two subsequent congeneric signal edges are equal to or shorter than the preselected threshold.

According to yet a further aspect it is provided a method of an ECU comprising the acts of receiving a signal having signal edges from a speed sensor device and analysing time intervals between subsequent congeneric signal edges. The act of analysing time intervals comprises determining a non-critical state of the speed sensor device, if the time intervals are higher than a preselected threshold, and determining a critical state of the speed sensor device, if the time intervals between two subsequent congeneric signal edges are equal to or shorter than the preselected threshold.

Some embodiments comprise digital circuitry installed within the apparatus for performing the respective acts. Such a digital control circuitry, e.g., a Digital Signal Processor (DSP), a Field-Programmable Gate Array (FPGA), an Application-Specific Integrated Circuit (ASIC), or a general purpose processor may be coupled to memory circuitry and needs to be configured accordingly by hardware and/or software. Hence, yet further embodiments also provide a computer program having a program code for performing embodiments of the method, when the computer program is executed on a computer or a programmable hardware device.

BRIEF DESCRIPTION OF THE FIGURES

Some embodiments of apparatuses and/or methods will be described in the following by way of example only, and with reference to the accompanying figures, in which.

DESCRIPTION OF EMBODIMENTS

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or group thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation of data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of acts leading to a desired result. The acts are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), Digital Signal Processors (DSPs), Application-Specific Integrated Circuits, Field Programmable Gate Arrays (FPGAs), computers, or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including Read Only Memory (ROM), Random Access Memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Figure 1:
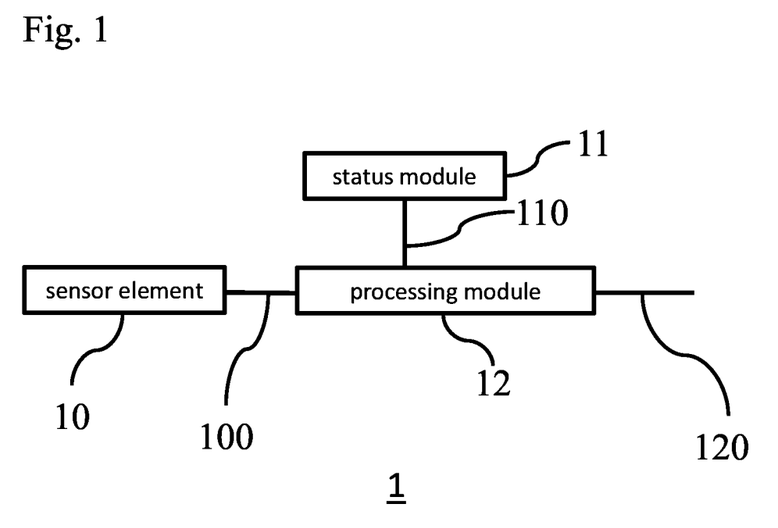
FIG. 1 illustrates a speed sensor device to generate an output signal for a control unit.

FIG. 1 represents a schematic illustration of example embodiment of a speed sensor device 1 which is configured to generate encoded signals for a control unit.

The speed sensor device 1 comprises a sensor element 10. The sensor element 10 is configured to provide a sensor signal 100. The speed sensor device 1 further comprises a status module 11 configured to provide status information 110. Furthermore, the speed sensor device 1 comprises a processing module 12 configured to generate an output signal 120. A module may fully or partially be implemented in hardware for example as a circuitry or part of a circuitry of a semiconductor chip. A module may in other embodiments be fully or partially implemented in software, middleware or firmware. For example, the status module may in some embodiments include any circuitry or part of a circuitry provided on a semiconductor chip which is capable of sensing or monitoring a status and generating status information based thereon. In some embodiments the status module may include software, middleware, firmware, data processing codes or parts thereof processed on a digital circuit of a semiconductor chip. In some embodiments, the processing module may be a digital processing module. In some embodiments, the status module and the processing module may include the same hardware components on the chip. In some embodiments the speed sensor device is a semiconductor chip with a monolithically integrated circuit provided thereon and a semiconductor package surrounding the semiconductor chip. In some embodiments, the sensor element, the status module and the processing module are monolithically integrated on a same semiconductor chip. In some embodiments, the speed sensor device may include more than one semiconductor chip provided within a common semiconductor package. For example, the sensing element may be provided on a first semiconductor chip and the status module and the processing module may be implemented on a second semiconductor chip. In other embodiments, a part of the sensing element, a part of the status module or a part of the processing module may be commonly implemented on a first semiconductor chip while other parts of the sensing element, the status module or the processing module may be implemented on a second semiconductor chip within the same semiconductor package.

In embodiments, the processing module is implemented as follows. If the status information 110 is indicative of a non-critical state of the speed sensor device 1, the output signal 120 is derived from the sensor signal 100. If, in contrast, the status information 110 is indicative of a critical state of the speed sensor device 1, the output signal 120 is a safety message signal having signal edges such that time intervals between subsequent congeneric signal edges are equal to or shorter than a preselected (time) threshold. The time intervals between subsequent congeneric signal edges may in some embodiments be time intervals between two consecutive positive signal edges (rising edge of a low-high transition of a two-level digital signal). In other embodiments, time intervals between subsequent congeneric signal edges may be time intervals between two consecutive negative signal edges (falling edge of a high-low transition of a two-level digital signal). Each time interval may include a minimum and a maximum of the output signal 120. In other words, a time interval may include a full period of the output signal 120.

Hence, the safety message signal, which is output by the processing module 12, if the speed sensor device 1 is in a critical state, may have or include a constant or variable frequency $f_{sm}$ equal to or higher than a threshold frequency $f_{th}$. As the safety message signal is a high frequency signal, which may be distinguished from the output signal in case of a non-critical state, a remote control unit receiving the safety message signal may unambiguously recognize the critical state of the speed sensor device 1. Thus, the critical state of the speed sensor device may be securely transmitted to the control unit and thus to a user.

In some implementations, sensor element 10 may be configured to measure a physical quantity indicative of a rotational speed of a rotatable target. The sensor signal 100 may be indicative of an oscillating physical quantity indicative of a wheel speed, for example. Variations of the oscillating quantity may be represented by signal edges in the sensor signal 100. In some implementations, the signal edges of the sensor signal 100 may define time intervals between two subsequent congeneric signal edges being longer than the preselected threshold. In other words, the sensor signal 100 may have a variable frequency indicative of a wheel speed, the frequency being below the threshold frequency $f_{th}$. The frequency of the sensor signal 100 may in some embodiments be a frequency in the frequency range from 0 Hz to the threshold frequency $f_{th}$.

In some embodiments, the time intervals between subsequent congeneric signal edges of the safety message signal may have a length determined as quotient of the preselected threshold and a natural number n. In other words, the length of the time intervals may be equal to the product of the preselected threshold and 1/n. The safety message signal may thus be an oscillating signal having constant frequency $f_{sm}$, which is a multiple of the threshold frequency $f_{th}$, such as one, two or more times the maximum sensor frequency $f_{th}$. In other words, $f_{sm} \geq f_{th}$, $f_{sm} \geq 2*f_{th}$, $f_{sm} \geq 3*f_{th}$, $f_{sm} \geq 4*f_{th}$, etc.

In other embodiments, the time intervals between subsequent congeneric signal edges of the safety message signal may depend on time intervals between two subsequent congeneric signal edges of the sensor signal 100. For example, the time intervals between subsequent congeneric signals of the safety message signal have a length determined as a difference of 1/n times the preselected threshold and 1/m times a time interval between two corresponding subsequent congeneric signal edges of the sensor signal 100, wherein n and m are natural numbers. In such implementations, the safety message signal may include the information that the speed sensor device 1 is in a critical status and information on the sensed wheel speed. The safety message signal may have a variable frequency $f_{sm}$ depending on the variable frequency of the sensor signal 100 and the threshold frequency $f_{th}$.

The signal derived from the sensor signal 1, which may be used as output signal 120 during non-critical states of the speed sensor device, may comprise signal edges such that time intervals between subsequent congeneric signal edges of the signal derived from the sensor signal 100 are longer than the preselected threshold. In other words, the signal derived from the sensor signal 100 may have a variable frequency corresponding to the variable frequency of the sensor signal 100 and being lower than the threshold frequency $f_{th}$. Thus, a control unit may be able to unambiguously differentiate the output signal 120 in a non-critical state from that in a critical state on the basis of the preselected threshold.

To summarize, in some embodiments the output signal 120 may have intervals between two subsequent congeneric signal edges. The time intervals may correspond to time intervals between two subsequent congeneric signal edges of the sensor signal 100, if the speed sensor device 1 is in a non-critical state. If the speed sensor device 1 is in a critical state, the time intervals are equal or higher that the preselected threshold.

The preselected time threshold may depend in some implementations on an application of the speed sensor device 1 and may be defined as the longest possible time interval between subsequent congeneric signal edges of the sensor signal 100 which cannot be reached in the corresponding application of the speed sensor device 1. In some embodiments the preselected threshold may be based on a rotational speed of a rotatable body of a vehicle corresponding to a top speed of the vehicle. Examples for the preselected threshold will be given further below.

The preselected threshold may be predetermined during production of the speed sensor device 1. In this case, the application of the speed sensor device 1 may be limited to a particular application. In alternative embodiments, the preselected threshold may be determined or varied dependent on the application of the speed sensor device 1, for example during installation thereof.

In some embodiments the preselected threshold may be configurable for example by storing in a memory device (not shown) of the speed sensor device 1. The memory device may be configured to store the predetermined threshold or may be configured to allow reprogramming the preselected threshold. In some implementations two or more values for the preselected threshold may be stored in the storage and the value corresponding to a particular application may be chosen at the time of installation or use.

In some implementations, the status information 110 may be information indicating operational problems or potential threats or risks to the operation of the whole speed sensor device 1 or one of the sensor element 10, the status module 11 or the processing module 12 or other circuit parts of the speed sensor device (e.g. an analog-to-digital converter). In some embodiments, the status information may be information provided to fulfil safety instrumented functions in accordance with safety standards such as SIL (safety integrity level) or ASIL (automotive safety integrity level) such as ISO 26262.

The status information 110 may be determined in different ways. For example, the status information 110 may be determined on the basis of general functional safety tests, for instance by a self-test, for example a Built-In Self-Test (BIST). In such an application the status module 11 may be configured as internal diagnostic block detecting circuit errors or chip errors in the speed sensor device 1. In other embodiments, the status information 110 may be determined based on comparison information of redundant paths. In further implementations, outer parameters, such as a temperature, for example a chip-temperature, or a supply voltage may be used for determining the status information 110. In such implementations the status module 11 may be a detector, such as a thermometer or a voltmeter.

In some embodiments the status information 110 may be indicative of at least two states. In some implementations these states may be a non-critical state (e.g. faultless state) and a critical state. The critical state is determined by the speed sensor device 1 as a state in which the sensor device is not capable to correctly sense and transmit rotational speed information of the monitored rotatable body or in which a risk is determined that the sensor device is not capable to correctly sense and transmit rotational speed information of the monitored rotatable body. The status information 110 may be binary information having a low level and a high level, wherein one of the low and the high level may be indicative of the non-critical state of the speed sensor device and the other of the low and the high level may be indicative of the critical state of the speed sensor device. In one embodiment the low level thereof may be indicative of a faultless state and a high level thereof may be indicative of a critical state. The critical state of the speed sensor device 1 may be a state in which the speed sensor device 1 is not able to output information of the sensor signal in a reliable way. In other words, in the critical state, a user may not trust in correct transmission of a rotational speed of a rotational body, for example one or more wheels.

In one or more embodiments, the status information 110 may be a signal indicative of more than two states of the group containing a faultless state, a critical state, an erroneous state and intermediate states. For example, the status information 110 may be ternary status information, wherein a low level thereof may be indicative of a faultless statue, an intermediate level thereof may be indicative of a critical state and a high level thereof may be indicative of an erroneous state.

The processing module 12 may be implemented in some embodiments as processing device provided by software configured to generate the output signal 120. In some other embodiments the processing module 12 may be implemented by hardware.

Figure 2:
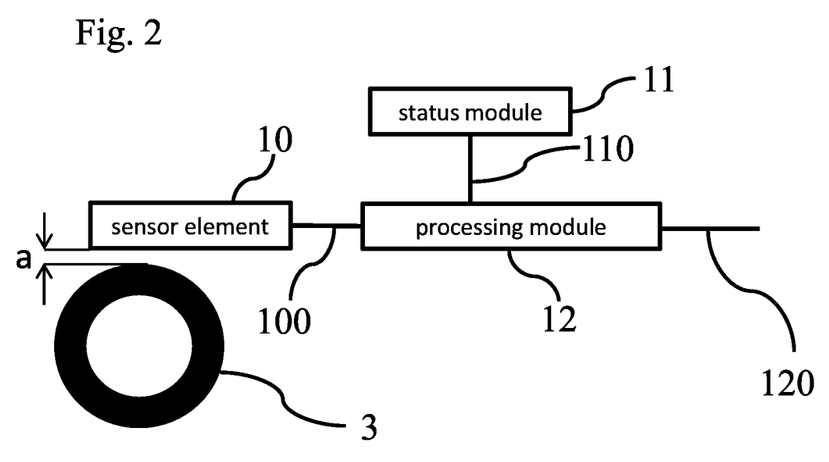
FIG. 2 illustrates the speed sensor device of FIG. 1 arranged to determine a wheel speed of a tire.

FIG. 2 illustrates an application of a speed sensor device 1 as explained with respect to FIG. 1.

FIG. 2 shows the speed sensor device 1, wherein the sensor element 10 is arranged adjacent to a rotatable target, for example one of the group containing a wheel 3, a transmission, a crank or a cam of an automobile. In alternative embodiments the rotatable target may be any other rotatable body, the wheel speed of which shall be monitored.

In some implementations, the sensor element 10 may be a magnetic field sensor element, which may be arranged adjacent to the rotatable target, e.g. the wheel 3, so as to measure a magnetic field indicative of the wheel speed of the rotatable target. Thereby the magnetic field sensor element may be one of the group of a Hall sensor, a Magneto-Resistive sensor (XMR sensor) or other suitable magnetometers. A Hall sensor is based on the principle of the commonly known Hall Effect, while a XMR sensor may be based on the principle of Ordinary Magneto-Resistance (OMR), Giant Magneto-Resistance (GMR), Colossal Magneto-Resistance (CMR), Tunnel Magneto-Resistance (TMR), or Anisotropic Magneto-Resistance (AMR). In other embodiments, the sensor element 10 may be an optical sensor element or any other sensor element configured to determine a rotational speed of a rotatable target.

The speed sensor device 1 may be formed as an electronic package comprising at least one chip including at least the sensor element 10 and the processing module 12. In some further embodiment the chip may further comprise the status module. In other embodiments the speed sensor device 1 may be a Multi-Chip Module (MCM) including two or more chips. Such an implementation of the speed sensor device 1 may avoid complicated wiring and may reduce the production costs.

The sensor signal 100 provided by the sensor element 10 may have a frequency indicative of the rotational speed of the rotatable target, for example of the wheel 3 or of a transmission. As already mentioned above, the output signal 120 may depend on the preselected threshold, the value of which may vary dependent on the application of the speed sensor device. In embodiments, according to which the rotational speed of a wheel 3 of an automobile is monitored by the sensor element 10, the preselected threshold may be a value in the range from $\frac{1}{1000}$ seconds to $\frac{1}{5000}$ seconds. In some implementations the preselected threshold may be substantially $\frac{1}{3000}$ seconds. In other words, the threshold frequency $f_{th}$ may be a frequency in the range from 1 kHz to 5 kHz, for example 3 kHz. In one embodiment a preselected time threshold of about $\frac{1}{3000}$ s or a frequency of about 3 kHz may indicate a top speed of the automobile of about 250 km/h. However, the preselected threshold or the threshold frequency $f_{th}$ may vary dependent on the type of the automobile such as the top speed thereof. Besides, the arrangement of the sensor element 10 and/or the design of the wheel 3 may influence the value of the preselected threshold or the threshold frequency $f_{th}$.

In alternative embodiments, according to which the rotational speed of a transmission of an automobile is monitored by the sensor element 10, the preselected threshold may be a value in the range from 1/7000 s to 1/13000 s. In some embodiments the preselected threshold may be substantially 1/10000 s. In other words, the threshold frequency $f_{th}$ may be a frequency in the range from 7 kHz to 13 kHz or about 10 kHz. In one embodiment, a preselected threshold of about 1/10000 s or a threshold frequency of about 10 kHz may indicate a top speed of the automobile of about 250 km/h. However, the preselected threshold or the threshold frequency $f_{th}$ may vary dependent on the type of the automobile such as the top speed thereof. Besides, the arrangement of the sensor element 10 and/or the design of the transmission may influence the value of the preselected threshold or the threshold frequency $f_{th}$.

In some implementations, the status module 11 may be configured to provide a status information 110 indicative of whether the supply voltage provided to the speed sensor device 1 or to at least one element of the speed sensor device is sufficient (non-critical state) or whether there is a lack of sufficient supply voltage provided to the speed sensor device 1 (critical state). In an alternative embodiment, the status signal 110 may indicate whether a memory of the speed sensor device 1 (not shown) is faultless (non-critical state) or whether a bit-error in a memory of the speed sensor device is present (critical state). In some other embodiments, the status information 110 may include information on whether a temperature of the speed sensor device 1 or a chip stress is lower or higher than a predetermined value.

In some further implementations, status information 110 provided by the status module 11 may be indicative of status information of a system to be monitored by the sensor 10. The system may be an automobile or any other system having a rotatable target such as a wheel 3 or a transmission, the rotational speed of which is to be monitored. For example, the status information 110 may be a signal provided by an additional sensor monitoring the system. In some implementations the sensor may be a sensor indicating an abrasion state of brakes of the automobile, a tire pressure, a moving direction or a temperature. In an alternative example the status signal 110 may be a signal determined on the basis of the sensor signal 100, for example indicative of an air gap a between the sensor element 10 and the rotatable target, for example the wheel 3. In other words, the status signal 110 may be indicative of any status information necessary for secure running a system such as an automobile.

Figure 3:
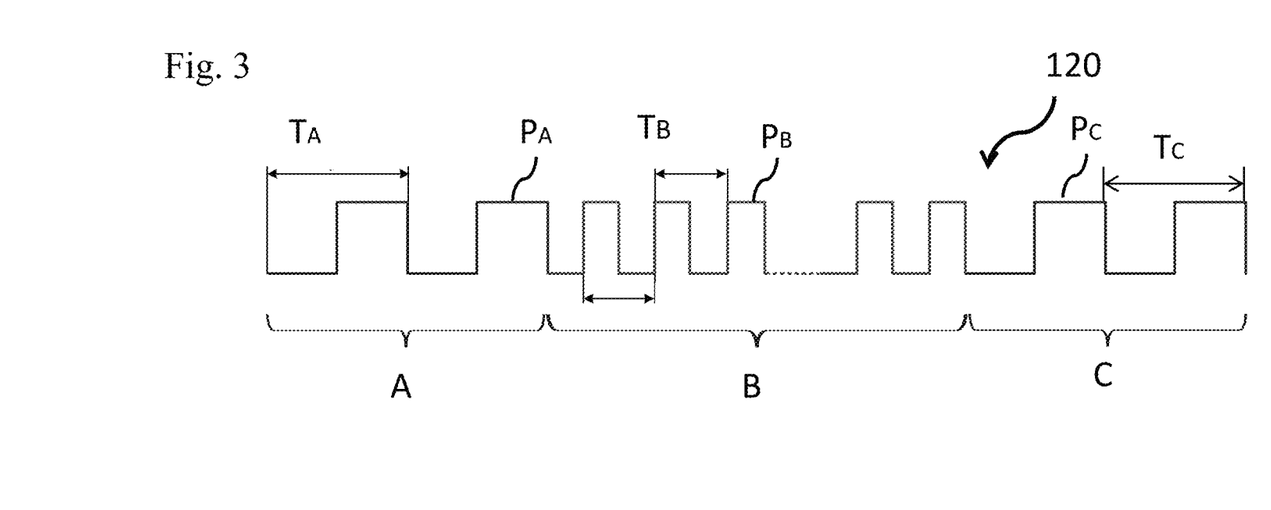
FIG. 3 presents a first embodiment of an output signal provided by the speed sensor device of FIG. 1.

It is now referred to FIG. 3, which presents an output signal 120 provided by the processing module 12.

The output signal 120 may be a signal oscillating between a maximum value and a minimum value and having signal edges formed between consecutive extremal values. Two subsequent or consecutive congeneric signal edges may define a time interval. In some implementations, the output signal 120 may be a square wave signal. The square wave signal may represent square wave wheel speed pulses. In one embodiment, the maximum value may be a current level $I_{high}$ of 14 mA and the minimum value may be a current level $I_{low}$ of 7 mA. The output signal 120 may have in some embodiments substantially constant amplitude. The term "substantially constant" may be understood as including variations of the sensor signal amplitude of less than 5%, preferably less than 2%, more preferably less than 1% of the sensor signal amplitude.

As shown by FIG. 3, the output signal 120 may be divided into three time blocks A, B and C. Time intervals $T_A$, $T_C$ between two subsequent congeneric signal edges of the output signal 120 during time blocks A and C differ from a time intervals $T_B$ between two subsequent congeneric signal edges of the output signal 120 during time block B. In other words, a frequency of the output signal 120 during time blocks A and C may differ from a frequency of the output signal 120 during time block B. In some implementations, the output signal 120 may indicate a faultless status during time blocks A and C and a critical status during time block B.

As shown by FIG. 3, time block A may comprise time intervals between two subsequent disparate signal edges. The time interval between a raising signal edge and an adjacent falling signal edge may be defined as a pulse width of a pulse $P_A$. During time block A, a duty cycle, which is defined as percentage of the pulse width with respect to the time interval $T_A$, may be 50%. In a similar manner also time block C may comprise time intervals between two subsequent disparate signal edges. The time interval between a raising signal edge and an adjacent falling signal edge may be defined as a pulse width of a pulse $P_C$. The duty cycle during time block C may be again 50%. In some implementations the duty cycle may vary during intervals A and C so as to allow transmitting additional information, for example information on an air gap between the sensor element and the rotatable target, a temperature, a moving direction or an abrasion status of the brakes.

During the time block A and the time block C the output signal 120 may have time intervals $T_A$ and $T_C$ having a duration corresponding to time intervals between two subsequent congeneric signal edges of the sensor signal 100. The time intervals $T_A$ and $T_B$ may be longer than the preselected threshold and may further be indicative of the rotational speed of a rotatable target such as the wheel 3. The time intervals between two subsequent congeneric signal edges of the sensor signal 100 may be for example proportional to the variations of a magnetic field indicative of the rotation of the rotatable target.

In contrast to time intervals $T_A$ and $T_C$, time intervals $T_B$ may be much shorter than time intervals $T_A$ and $T_C$. In some embodiments, each time interval $T_B$ may be half of the time interval $T_A$ or $T_C$. In other words, the frequency of the output signal 120 may be increased during time block B. In some implementations, the time intervals $T_B$ during time block B of the output signal 120 may be equal to or shorter than the preselected threshold. In other words, a frequency of the output signal 120 during time block B may be equal to or higher than the threshold frequency $f_{th}$. As illustrated by FIG. 3 the time intervals $T_B$ of the output signal 120 may be half the preselected threshold. However, as mentioned above, the time interval $T_B$ may correspond to 1/n times the preselected threshold or a difference of at least the preselected threshold and each time interval between two subsequent congeneric signal edges of the sensor signal. The pulses $P_A$, $P_B$, $P_C$ of the output signal 120 may have a duty cycle of 50% during all time blocks A, B and C.

In some implementations, the time block B may last for a plurality of time intervals $T_B$. In some implementations the critical state may be a permanent or long lasting state and the time block B may last until the critical state is removed or repaired.

The output signal 120 may allow transmitting time intervals between two subsequent congeneric signal edges of the sensor signal 100 to a control unit, such as an ECU of an automobile, and further transmitting a safety message signal indicative of a critical state or an error. The output signal 120 may allow the control unit to unambiguously determine critical state and thus to increase the safety conditions of the speed sensor device 1.

Thus, the speed sensor device 1 may avoid the output of a standard sensor protocol with constant currents $I_{low}$=7 mA or $I_{high}$=10 mA in case of an error. It may be avoided that an internal error of the speed sensor device may not be differentiated from the case that a standstill of the rotatable target is output (for instance for ABS-application), the stand still of the rotatable target being indicated by a constant current ($I_{low}$ or $I_{high}$) in accordance with a current magnetic field.

In other words, the speed sensor device 1 may be adapted to transmit an unambiguous sensor response to the control unit (ECU), which may be transmitted on the basis of a standard wheel speed sensor protocol ($I_{low}$ and $I_{high}$), in case of an error within the wheel speed sensor or in the event of an external disturbance (e.g. drop of the supply voltage $V_{DD}$ below a predetermined threshold value). Thus, no additional hardware components may have to be provided in order to implement for example an additional detection of a third output current level. The implementation of the new functionality in the control unit may be carried out by software technical provisions.

Figure 4:
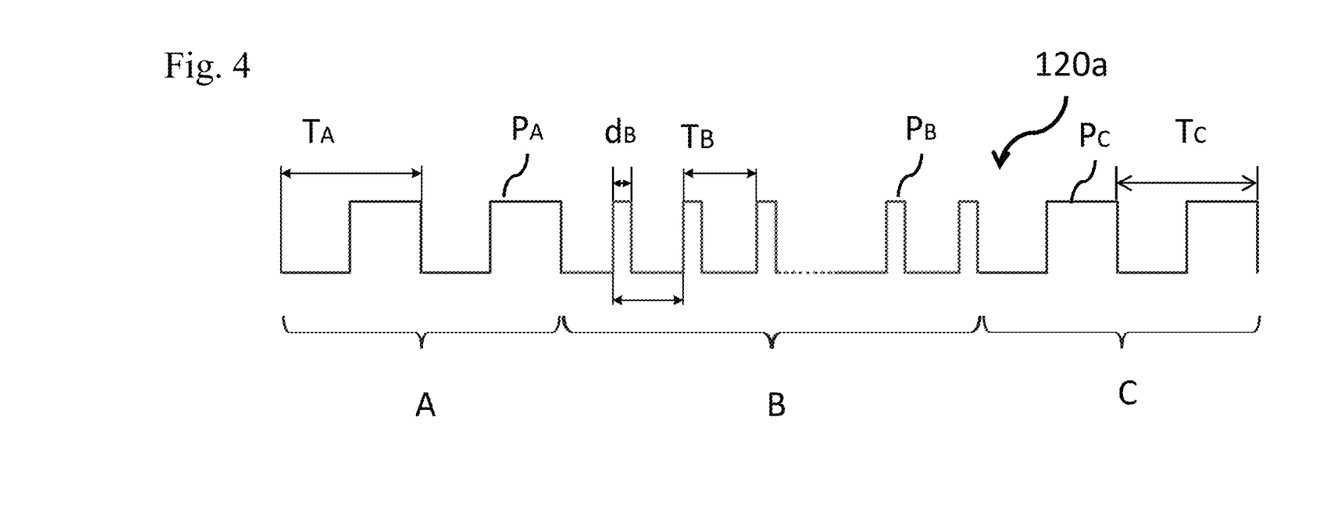
FIG. 4 presents a second embodiment of an output signal provided by the speed sensor device of FIG. 1.

FIG. 4 illustrates another example of an output signal 120a.

The output signal 120a may be divided into three time blocks A, B and C. Time blocks A and C are not explained in further detail, as they are comparable with time blocks A and C of output signal 120 of FIG. 3. Time block B of output signal 120a may have time intervals between two subsequent congeneric signal edges equal to or shorter than the preselected threshold and shorter than the time intervals between two subsequent congeneric signal edges of the sensor signal 100 during time blocks A and C. In one embodiment each time interval $T_B$ during time block B may be half the preselected threshold. In addition, the duty cycle of the output signal 120a during time block B may be varied. In one embodiment the duty cycle may be reduced to a duty cycle of less than 50%, for example to a duty cycle of 25%. In other words, the pulse width of pulses $P_B$ may be reduced compared to the pulse width of pulses $P_B$ in FIG. 3. In other words, the output signal 120a may allow signalling internal status information based on doubled frequency of the safety message and additional adaptation of the duty cycle for an unambiguous identification (25%/75%→$t_{on}$/$t_{off}$ ratio).

Figure 5:
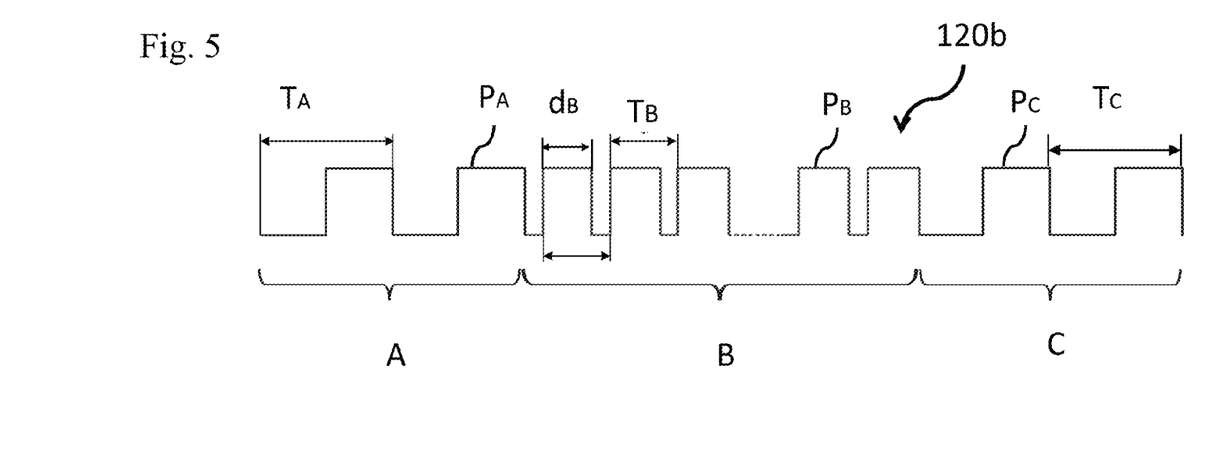
FIG. 5 illustrates another embodiment of a speed sensor device to generate an output signal for a control unit.

As presented by FIG. 5, which illustrates a further example of an output signal 120b, the duty cycle of the output signal 120a during time block B may be increased to a duty cycle of more than 50%, for example to a duty cycle of 75%. In other words, the pulse width of pulses $P_B$ may be increased compared to the pulse width of pulses $P_B$ in FIG. 3. With respect to intervals A and C of the output signal 120b and the frequency during interval B it is referred to the explanations given related to FIG. 3.

A variation of the duty cycle may be an increase of the duty cycle to 60% or more, or a decrease to 40% or less. Smaller variations of the duty cycle may not be differentiated from small duty cycle deviations caused by vibrations of the sensor element 10, for example due to braking events of an automobile. By variation of the duty cycle in a time block indicative of a critical status or an erroneous status it may be possible to differentiate between different status information. Thus, the decrease of the length of time intervals between two subsequent congeneric signal edges to or below the preselected threshold may indicate that the speed sensor device is in a state other than the faultless state. As the duty cycle may be varied in addition, the duty cycle may be indicative of the different status information. For example, in case that the status information 110 provided by the status module 11 is a ternary information signal having three levels, the duty cycle of the output signal may indicate whether the speed sensor device 1 is in faultless state, in a critical state or in an erroneous state. For instance a signal as presented during time block B of FIG. 4 may indicate the critical status, if the supply voltage is below a first threshold, and a signal as presented during interval B of FIG. 5 may indicate the erroneous state, for example, if the supply voltage is below a second threshold.

Figure 6:
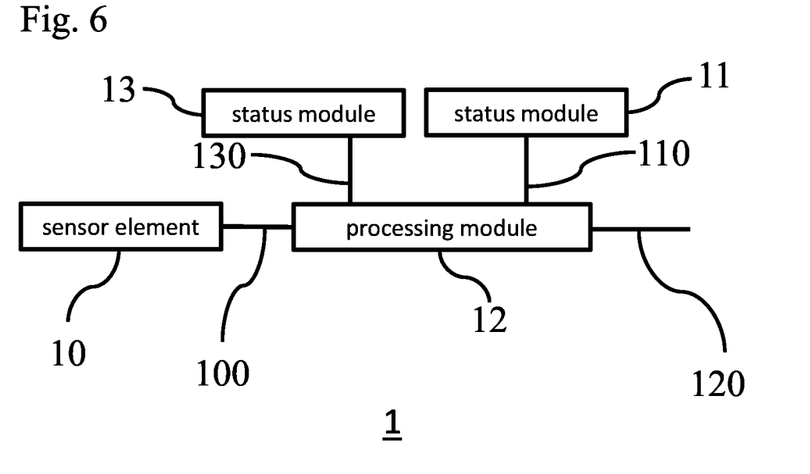
FIG. 6 presents a third embodiment of an output signal provided by the speed sensor device of FIG. 1.

In another embodiment, which is illustrated in FIG. 6, the speed sensor device 1 may further comprise an additional status module 13. The status module 13 may be configured to provide additional status information 130. The processing module 12 may be configured to generate an output signal 120 further depending on the additional status information 130. The additional status information 130 may be a signal as explained with respect to the status information 110. For example, the additional status information 130 may provide status information of the speed sensor device 1 itself or a component thereof. The additional status information 130 may be not identical with the status information 110. In some implementations the time intervals between two subsequent congeneric signal edges of the output signal 120 may be equal to or shorter than the preselected threshold, if the addition status information 130 is indicative of a critical state.

In one example, the status information 110 may indicate, whether the supply voltage of the sensor is sufficient. The additional status information 130 may indicate, whether an inner storage of the sensor has a bit-error. As a result, the output signal 120 may have a time block with reduced time intervals between two subsequent congeneric signal edges and increased duty cycle in response to a status information 110 indicating lack of sufficient voltage supply such as time block B of FIG. 5. Besides, the output signal 120 may have a time block with reduced time intervals between two subsequent congeneric signal edges and decreased duty cycle indicative of a bit error, such as interval B of FIG. 4. In other implementations the intervals may indicate other critical states.

In other implementations, further status modules may be provided, so as to provide further status signals so as to transmit a more concrete image of the total status of the speed sensor device 1.

Figure 7:
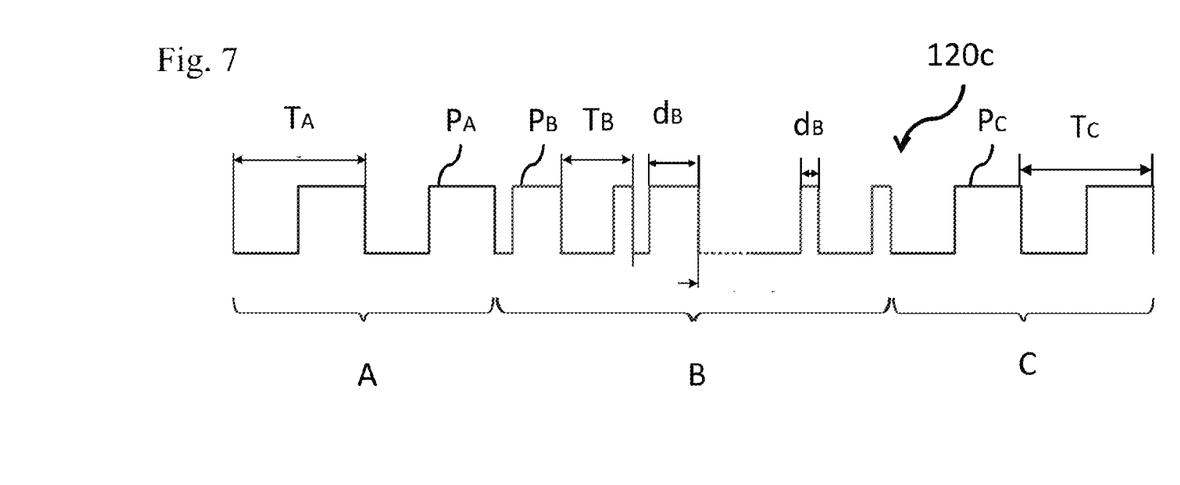
FIG. 7 presents a fourth embodiment of an output signal provided by the speed sensor device of FIG. 1.

FIG. 7 illustrates a further example of an output signal 120c.

The output signal 120c differs from the output signals of FIGS. 3 to 5 only with respect to the intermediate time block B. Therefore, an explanation of the identical features is omitted. The time block B shows a decrease of time intervals between two subsequent congeneric signal edges to or below the preselected threshold. Time block B has a plurality of time intervals, which may be divided in a first group of time intervals $T_{B1}$ and a second group of time intervals $T_{B2}$. The time intervals $T_{B1}$ and $T_{B2}$ differ from each other in that their duty cycle is different. In the embodiment of FIG. 7 the time intervals $T_{B1}$ and $T_{B2}$ may alternate. In other embodiments, other sequences of time intervals $T_{B1}$ and $T_{B2}$ may be possible, for example two intervals $T_m$ may be followed by one interval $T_{B2}$. In further embodiments it is also possible, that the sequence may be changes during one time block B.

In some implementations the duty cycle of time intervals $T_{B1}$ may be higher than 50% and the duty cycle of time intervals $T_{B2}$ may be lower than 50%. In some embodiments the duty cycle of time intervals $T_m$ may be x % and the duty cycle of time intervals $T_{B2}$ may be 100%-x %, wherein x % is higher than 50% and lower than 100% or wherein x % is higher than 60% and lower than 100%. In other words, the output signal 120c may be inverted during time intervals $T_{B2}$ during time block B. In the implementation of FIG. 7 the duty cycle of time interval $T_{B1}$ may be 75% and the duty cycle of time interval $T_{B2}$ may be 25%. The configuration of time block B of FIG. 7 may allow a transmission of detailed and unambiguous status information to the control unit.

Figure 8:
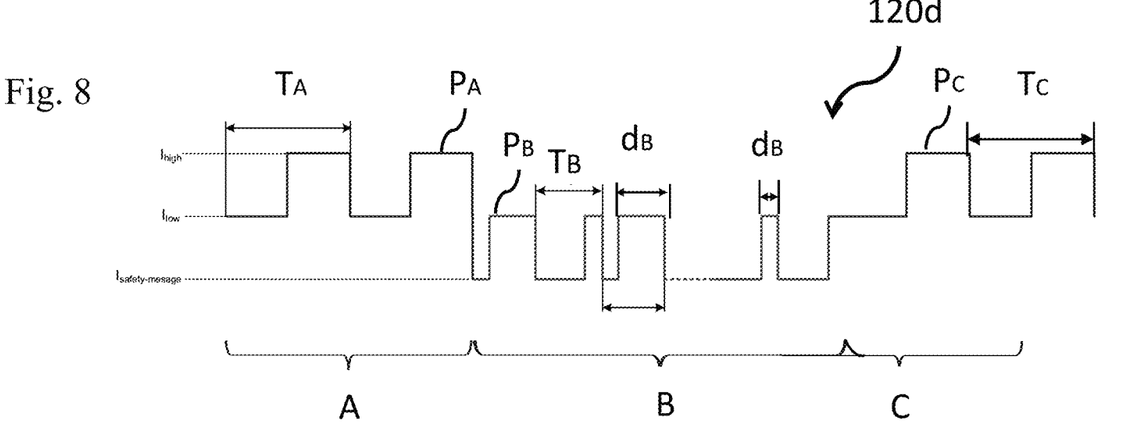
FIG. 8 presents a fifth embodiment of an output signal provided by the speed sensor device of FIG. 1.

FIG. 8 shows a further example of an output signal 120d. The output signal 120d is comparable with the output signal 120c of FIG. 7. The signals differ from each other only in that the output signal 120d is provided with an offset during time block B indicative of a critical state. In some implementations an amplitude of the output signal during time block B may be increased or decreased. In other words, the output signal 120d may have a third constant level other than the maximum value and the minimum value and the sensor output signal may oscillate between the third constant level and the maximum value or the minimum value. In the example of FIG. 8 the third constant level the may be a constant current level $I_{safety\text{-}maessage}$ of 0 mA. During time blocks A and C the output signal oscillates between current levels $I_{high}$ and $I_{low}$. During time block B the output signal oscillates between current levels $I_{low}$ and $I_{safety\text{-}message}$.

As already mentioned above, the output signal having time intervals between two subsequent congeneric signal edges equal to or lower than the preselected threshold or having a frequency higher than the threshold frequency $f_{th}$ during a time block indicative of a critical state may allow a transmission of a safety information in a secure and unambiguous way. Furthermore, by changing the duty cycle and/or an offset during the interval indicative of the critical state the type of status defect may be transmitted. Thus, the control unit, such as the ECU, may analyse the output signal and may detect not only the presence of an error but may also determine the particular defect, such as a too low supply voltage, too high chip temperature or bit error. Thus, the defect may be quickly determined and repaired.

Figure 9:
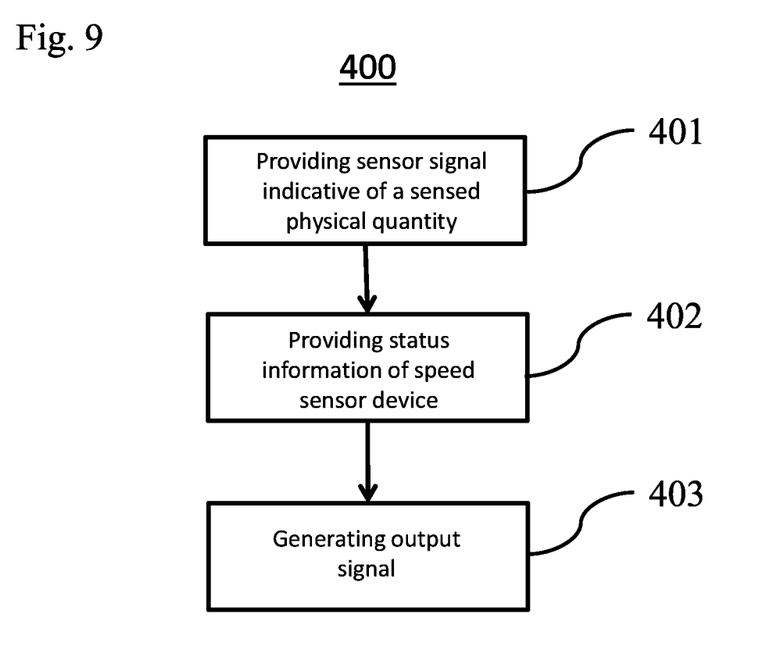
FIG. 9 presents a method of generating an output signal.

It will be apparent to the skilled person that the speed sensor device 1 of FIG. 1 and the previously described embodiments thereof may be configured to perform a corresponding method for generating encoded signals for a control unit. A flowchart 400 of an example embodiment of the method is illustrated in FIG. 9.

The method 400 comprises an act 401 of providing a sensor signal 100 indicative of a sensed physical quantity. The sensor signal 100 may have signal edges. The method further includes an act 402 of providing status information 110 of a speed sensor device 1. A further act 403 comprises generating an output signal 120. If the status information 110 is indicative of a non-critical state of the speed sensor device 1, the output signal 120 is derived from the sensor signal 100. If, in contrast, the status information 110 is indicative of a critical state of the speed sensor device 1, the output signal 120 is a safety message signal having signal edges such that time intervals between subsequent congeneric signal edges are equal to or shorter than a preselected threshold.

In some embodiments, the act 401 may include providing the sensor signal 100 having time intervals between two subsequent congeneric signal edges having a length larger than the preselected threshold. In other words, the sensor signal may have a variable frequency in a frequency range from 0 Hz to a threshold frequency $f_{th}$.

In some embodiments, act 403 may comprise generating the output signal having time intervals between two subsequent congeneric signal edges based on time intervals between two subsequent congeneric signal edges of the sensor signal, if the status signal is indicative of a non-critical state.

In some embodiments, the time intervals between subsequent congeneric signal edges of the safety message signal may have a length determined as quotient of the preselected threshold and n, wherein n is a natural number. In some other embodiments, the time intervals between subsequent congeneric signal edges of the safety message signal may depend on time intervals between two subsequent congeneric signal edges of the sensor signal 100. For example, the time intervals between subsequent congeneric signals of the safety message signal may have a length determined as a difference of 1/n times the preselected threshold and 1/m times a time interval between two corresponding subsequent congeneric signal edges of the sensor signal 100, wherein n and m are natural numbers. In such implementations the safety message signal may include the information that the speed sensor device 1 is in a critical status and information on the sensed wheel speed.

In some implementations the method may further comprise at least one act of receiving at least further status information 130. The act 403 may comprise generating the output signal also depending on the further status information 130.

With respect to further details of the method it is referred to the explanations given with respect to speed sensor device 1, which may be transcribed to the features of the method.

Figure 10:
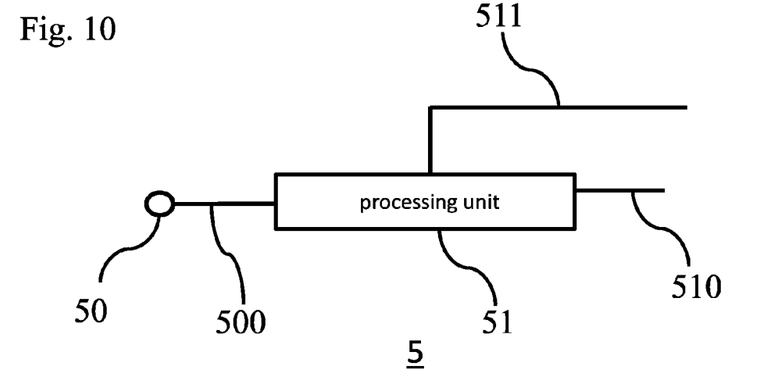
FIG. 10 illustrates an electronic control unit to analyze a signal having signal edges from a speed sensor device.

According to a further aspect, it is provided an electronic control unit (ECU) 5, to analyse encoded signals such as the output signal discussed above. An example embodiment of an ECU is illustrated by FIG. 10.

The ECU 5 comprises an interface 50. The interface 50 is configured to receive an input signal 500 having time intervals between subsequent congeneric signal edges from a speed sensor device. The time intervals between subsequent congeneric signal edges have a length below, equal to or above the preselected threshold. The ECU 5 further includes a processing unit 51. The processing unit 51 is configured to determine whether the time intervals between subsequent congeneric signal edges of the input signal have a length below the preselected threshold or whether the time intervals between subsequent congeneric signal edges of the input signal have a length above the preselected threshold. The ECU 51 is further configured to generate a first signal 510 indicative of time intervals between subsequent congeneric signal edges of a sensor signal, if the time intervals between subsequent congeneric signal edges of the input signal are above the threshold, or to generate a second signal 511 indicative of a critical state, if the time intervals between subsequent congeneric signal edges of the input signal are equal to or below the preselected threshold.

Figure 11:
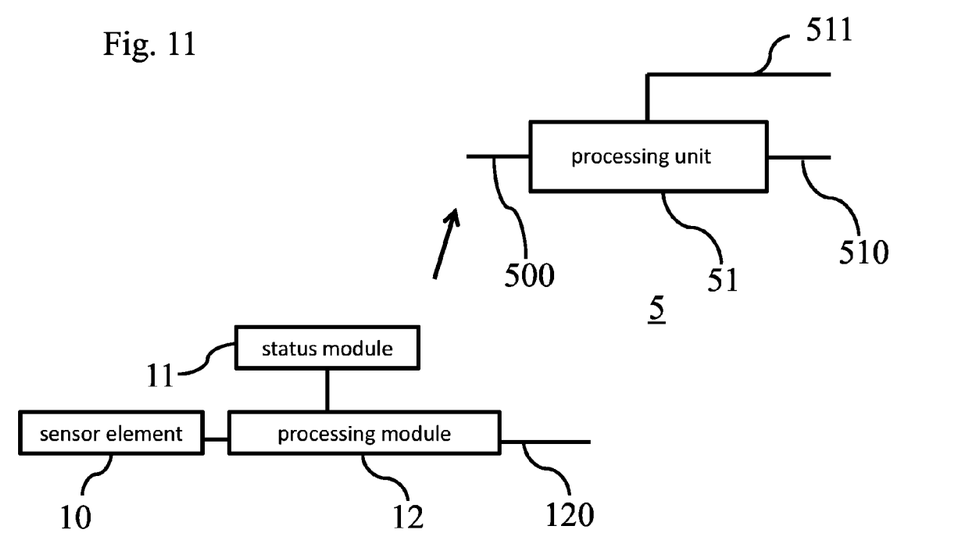
FIG. 11 illustrates a speed sensor device presented by FIG. 1 and an electronic control unit of FIG. 10.

In some embodiments, as presented by FIG. 11, the input signal 500 received by the interface 50 may be the output signal 120 output by the processing module 12 of the speed sensor device 1. The input signal 500 may be transmitted via wired transmission or via wireless transmission. In some embodiments, the input signal 500 may encode a frequency indicative of the wheel speed of a rotatable target monitored by the speed sensor device and at least one status information about a status of speed sensor device 1 or at least one element thereof. The processing unit 51 may thus be configured to determine by comparing the time intervals between subsequent congeneric signal edges of the input signal 500, which may be in some implementations the time intervals between subsequent congeneric signal edges of the output signal 120, whether the time intervals are longer than the preselected threshold and thus indicative of the wheel speed of a rotatable target or whether the time intervals between subsequent congeneric signal edges are equal to or shorter than the preselected threshold and thus indicative of a critical state.

In other embodiments, the processing unit 51 may be configured to recognize a volatile increase or decrease of the time intervals between subsequent congeneric signal edges of the input signal and to determine the time intervals between subsequent congeneric signal edges of the sensor signal even during a critical state. For example, the time intervals of the input signal may be equal to the time intervals of the sensor signal in case of a faultless state and equal to the difference of the preselected threshold or 1/n times the preselected threshold and the time intervals of the sensor signal in case of a critical state.

Besides, in some implementations the processing unit 51 may be configured to further analyse the duty cycle of the input signal 500. In dependence of the duty cycle the processing unit 51 may be able to determine the type of the critical state. Thus, the processing unit 51 may differentiate for example whether the supply voltage is not sufficient or whether there is a bit error in a storage or the like. More generally spoken, the processing unit 51 may be configured to differentiate between two or more critical states by analysing time intervals between two subsequent disparate signal edges, the time intervals being shorter or smaller than the preselected threshold.

The processing module 51 may be configured to decode input signals having a profile as presented with respect to the output signal s by FIGS. 3 to 5, 7 and 8 and to recognize not only the existence of a critical state but also to determine the kind of critical state.

Figure 12:
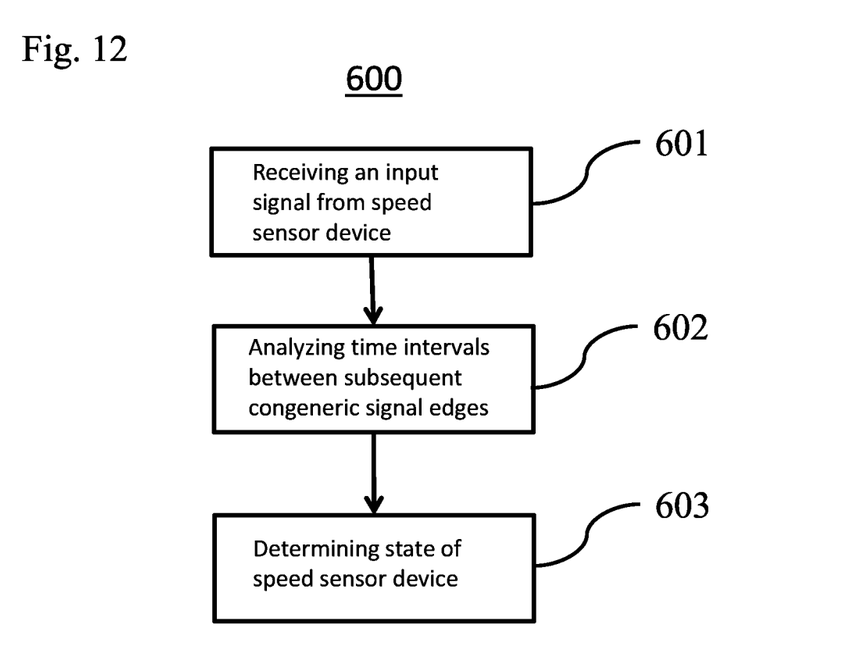
FIG. 12 presents a method of decoding a signal having signal edges from a speed sensor device.

It will be apparent to the skilled person that the decoding device 5 of FIG. 10 and the previously described embodiments thereof may be configured to perform a corresponding method. A flowchart 600 of an example embodiment of the method is illustrated in FIG. 12.

The method 600 comprises an act of receiving 601 an input signal having signal edges from a speed sensor device. The method further includes an act 602 of analysing time intervals between subsequent congeneric signal edges of the input signal. Besides, the method comprises an act 603 of determining a non-critical state of the speed sensor device, if the time intervals are higher than a preselected threshold, and a critical state of the speed sensor device, if the time intervals between two subsequent congeneric signal edges are equal to or shorter than the preselected threshold. Further details of the method 600 may be evident to a skilled person from the features explained with respect to the ECU 5, which may be transcribed to the features of the method.

To summarize, in the event of an error within a wheel speed sensor or during corresponding detection (e.g. in the event of bit-errors in an internal sensor storage) or in the event of external disturbance (low voltage of the external power supply) the unit and the method to generate signals for a control unit allow by a so-called safety mechanism transmitting an information on the error to the electronic control unit (ECU) via a high frequency current or voltage modulation on the basis of a standard wheel speed sensor protocol.

As a frequency of signaling a so-called safety state mechanism (safe state) a multiple of the threshold frequency (e.g. $f_{sm} \geq 2*f_{th}$, $3*f_{th}$, $4*f_{th}$ etc.) of the input sensor signal such as the input sensor signal indicative of the magnetic field of the rotatable target may be used.

Typical input sensor frequencies indicative of a magnetic field may be for corresponding wheel speed applications (e.g. ABS applications, transmission applications) in the range of $f_{th} \leq 3$ kHz for ABS applications and $f_{th} \leq 10$ kHz for transmission applications. Accordingly, the signaling frequency may be chosen as a multiple of the magnetic threshold frequency $f_{th}$.

A further possibility of transmitting internal status or error indications using a standard wheel speed protocol may be to adapt in addition to the high frequency signaling also the duty cycle variation of the specification of the wheel speed sensor protocols, namely the duty cycle, from 35%/65% or 40%/60% to duty cycles values of <30% or >70%. This may be a further possibility to differentiate the status or error indication information from a transmission of wheel speed information from the sensor. A further possible variant might be to transmit the safety state on the basis of a frequency equal to the threshold frequency $f_{th}$, since the ECU might recognize the safety state due to the duty cycle, which is known as a-typical duty cycle (outside a specification of the standard protocol).

A further protocol variant may surrender from a change of low- and high-information (extended safety message of FIG. 7) within the wheel speed sensor protocol, to transmit additional internal status and error information, which may be unambiguously differentiated by the control unit.

As especial case the low voltage recognition at a drop of the supply voltage surrenders, in the case that the supply voltage falls very quickly below a threshold value and it is not possible to transmit a safety message, so that a safety message may be sent only after leaving the low voltage condition. Thus, it would be possible for the control unit to recognize the voltage drop later on.

With the subject matter explained above, it is possible, that wheel speed sensors used e.g. in ABS applications or in transmission applications, and having a standard output protocol such as a current protocol with $I_{low}=7$ mA and $I_{high}=14$ mA may transmit in addition to the transmission of a wheel speed information (proportional to the frequency of the output protocol) and optionally an information about a rotational direction (coded in a pulse-width modulation) a status information or error indication. Thus, it is possible for the control unit (ECU) to transmit a corresponding, broadened sensor information, so as to signalize an error in an error case and to achieve a so called safe state (e.g. safe state according to ISO26262), which may be detected from outside. This is necessary, to achieve the requirements concerning the new automobile standard of ISO26262 (functional security of E/E systems).

The description and drawings merely illustrate the principles of the invention. It will thus be appreciated that those skilled in the art will be able to devise various arrangements that, although not explicitly described or shown herein, embody the principles of the invention and are included within its spirit and scope. For example, while embodiments have been described herein with respect to a rotational speed sensor device, it is to be understood that the principles of the invention can be implemented in any other sensor device which may have sensing elements to sense other physical quantities.

Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The invention claimed is:

1. A speed sensor device, comprising:
a sensor element to provide a sensor signal;
a status module to provide status information of the speed sensor device; and
a processing module to generate an output signal, wherein the output signal is derived from the sensor signal, if the status information is indicative of a non-critical state of the speed sensor device, and wherein the output signal is a safety message signal having signal edges such that time intervals between subsequent congeneric signal edges are equal to or shorter than a preselected threshold, if the status information is indicative of a critical state of the speed sensor device.

2. The speed sensor device of claim 1, wherein the time intervals between subsequent congeneric signal edges of the safety message signal have a length determined as quotient of the preselected threshold and n, wherein n is a natural number higher than 1.

3. The speed sensor device of claim 1, wherein the signal derived from the sensor signal comprises signal edges such that time intervals between subsequent congeneric signal edges of the derived signal are longer than the preselected threshold.

4. The speed sensor device of claim 1, wherein the sensor signal comprises signal edges and wherein the preselected threshold depends on an application of the speed sensor device and is the longest possible time interval between subsequent congeneric signal edges of the sensor signal, which can not be reached in the corresponding application of the speed sensor device.

5. The speed sensor device of claim 1, wherein the preselected threshold is a value in the range from $1/1000$ s to $1/5000$ s, if the speed sensor device is applied to determine a rotational speed for ABS applications in an automobile.

6. The speed sensor device of claim 1, wherein the preselected threshold is a value in the range from $1/7000$ s to $1/13000$ s, if the speed sensor device is applied to determine a rotational speed for transmission applications in an automobile.

7. The speed sensor device of claim 1, wherein the preselected threshold is predetermined during production of the speed sensor device or selected dependent on the application of the speed sensor device during installation thereof.

8. The speed sensor device of claim 1, wherein the sensor module is a magnetic field sensor module and the sensor signal is indicative of an oscillating magnetic field indicative of a revolution speed of a rotatable body.

9. The speed sensor device of claim 1, wherein the status information is determined on the basis of general functional safety tests, of comparison information of redundant paths or of outer parameters.

10. The speed sensor device of claim 1, wherein the critical state of the speed sensor device is a state in which the speed sensor device is not able to output information of the sensor signal in a reliable way.

11. The speed sensor device of claim 1, wherein the critical state is indicative of a lack of sufficient supply voltage provided to the speed sensor device or indicative of a bit-error in a storage of the sensor or indicative of an outer parameter.

12. The speed sensor device of claim 1, wherein the status module is configured to output a status signal having a low level and a high level, wherein one of the low and the high level is indicative of the non-critical state of the speed sensor device and the other of the low and the high level is indicative of the critical state of the speed sensor device.

13. The speed sensor device of claim 1, wherein the status module is configured to provide status information indicative of a further critical status and the safety message signal is indicative of a type of the critical states.

14. The speed sensor device of the claim 1, wherein the safety message signal has time intervals between two subsequent disparate signal edges being shorter or longer than half of the time interval between two subsequent congeneric signal edges of the safety message signal, if the state signal is indicative of the critical state.

15. The speed sensor device of the claim 1, wherein the time interval between two subsequent disparate signal edges of the safety message signal is shorter than 40% or longer than 60% of the time interval between two subsequent congeneric signal edges of the safety message signal, if the state signal is indicative of the critical state.

16. The speed sensor device of the claim 1, wherein the time intervals between two subsequent disparate signal edges of the safety message signal vary periodically, if the state signal is indicative of the critical state.

17. The speed sensor device of the claim 1, wherein the safety message signal is provided with an offset compared to the output signal being the sensor signal or derived from the sensor signal.

18. A speed sensor method comprising the acts of: receiving a sensor signal indicative of a sensed physical quantity from a sensor element of a speed sensor device;
providing a status information of the speed sensor device; and
generating an output signal, wherein the output signal is derived from the sensor signal, if the status information is indicative of a non-critical state of the speed sensor device, and wherein the output signal is a safety message signal having signal edges such that time intervals between subsequent congeneric signal edges are equal to or shorter than a preselected threshold, if the status information is indicative of a critical state of the speed sensor device.

19. An electronic control unit comprising: an interface for receiving a signal having signal edges from a speed sensor device, and a processing unit to analyse time intervals between subsequent congeneric signal edges, wherein the processing unit is configured to determine a non-critical state of the speed sensor device, if the time intervals are higher than a preselected threshold, and to determine a critical state of the speed sensor device, if the time intervals between two subsequent congeneric signal edges are equal to or shorter than the preselected threshold.

20. The electronic control unit of claim 19, wherein the processing unit is configured to differentiate between two or more critical states by analysing time intervals between two subsequent disparate signal edges, the time intervals being shorter than the preselected threshold.

* * * * *